June 20, 1939.　　H. H. ROMINGER　　2,163,064
TWINE DISPENSER
Filed Jan. 10, 1938　　2 Sheets-Sheet 1
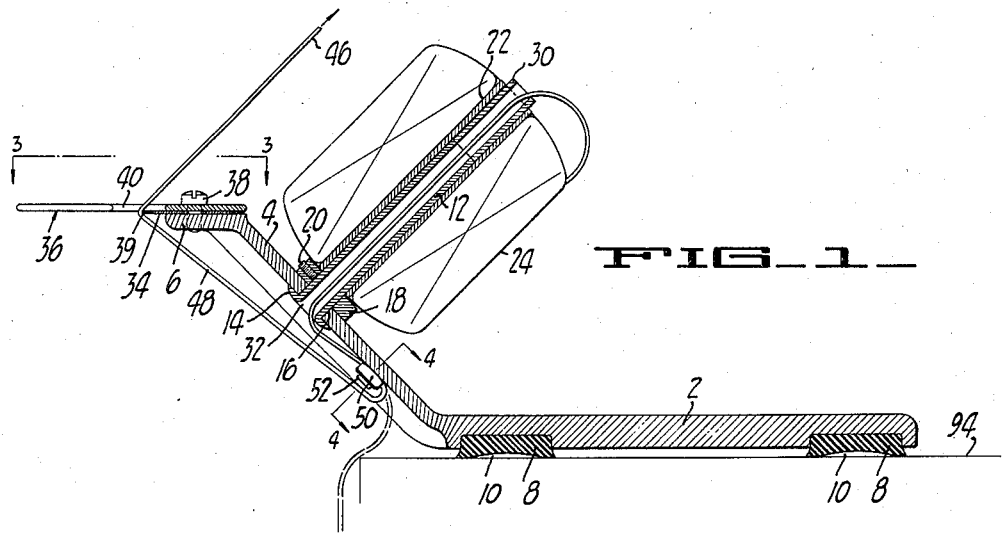
FIG_1_
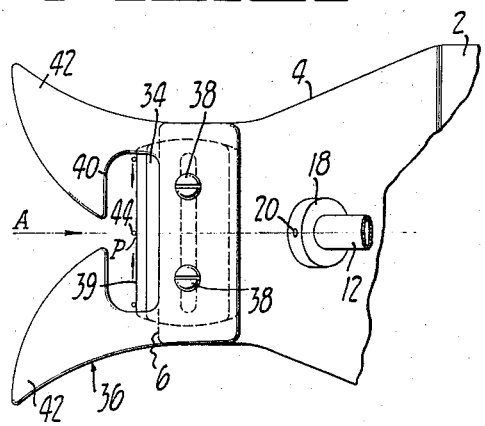
FIG_3_
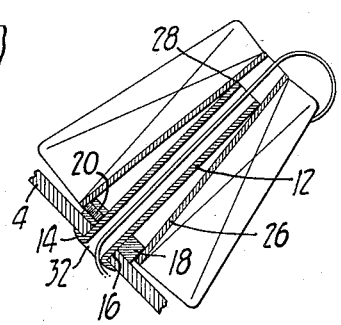
FIG_2_
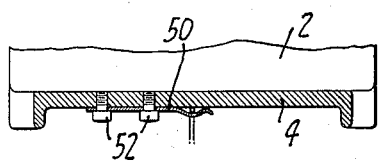
FIG_4_
INVENTOR.
Herbert H. Rominger
BY Boyken & Mohler
ATTORNEYS June 20, 1939.　　H. H. ROMINGER　　2,163,064
TWINE DISPENSER
Filed Jan. 10, 1938　　2 Sheets-Sheet 2
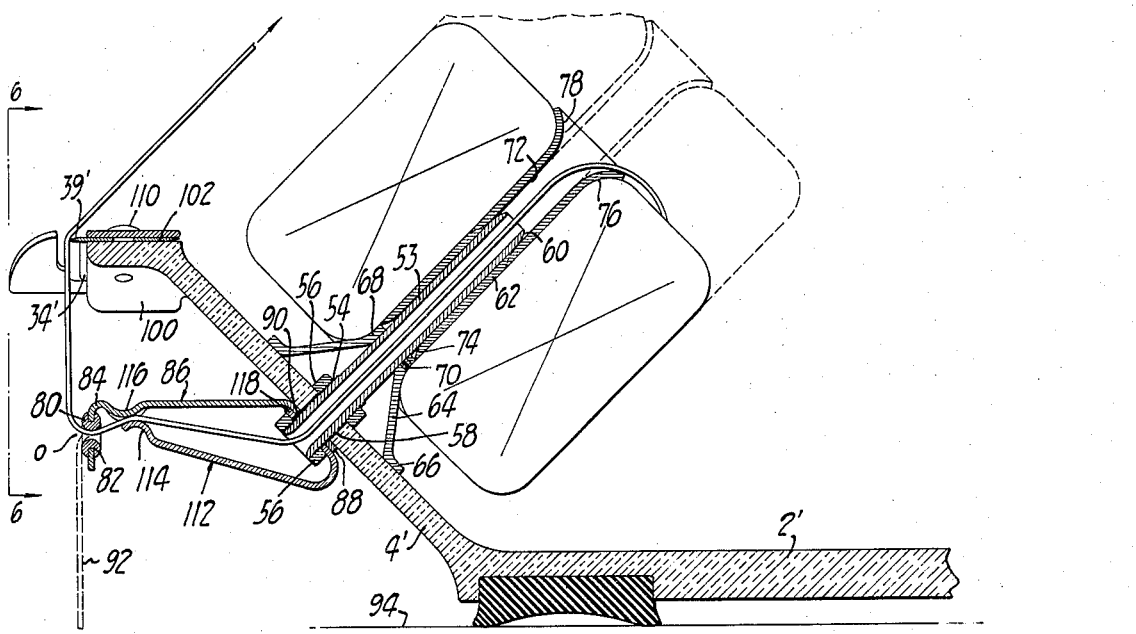
FIG_5_
FIG_6_
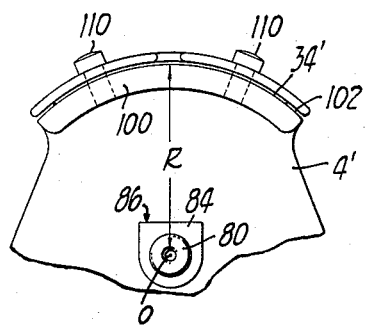
INVENTOR.
Herbert H. Rominger
BY
Boyken & Mohler
ATTORNEYS Patented June 20, 1939

2,163,064

UNITED STATES PATENT OFFICE 2,163,064

TWINE DISPENSER

Herbert H. Rominger, Oakland, Calif., assignor to J. Edney Harton, Oakland, Calif.

Application January 10, 1938, Serial No. 184,172

4 Claims. (Cl. 242—142)

This invention relates to a device for dispensing twine or cord and the like, and the invention has for a principal object the provision of an apparatus of this character adapted to support a spool of twine in an inclined, elevated position, relative to a horizontal supporting surface, for facilitating the unwinding of the twine through the core of the spool, and another object is the provision of twine cutting means as part of said apparatus positioned to enable rapid and easy cutting of lengths of twine drawn from the spool.

Specific objectives of the invention will appear upon consideration of the following specification from which reference may be had to the accompanying drawings for illustration of preferred embodiments thereof and in which:

Fig. 1 is a sectional view of one embodiment of the invention;

Fig. 2 is a fragmentary section illustrating an alternative mode of use of the device of Fig. 1;

Fig. 3 is a fragmentary plan view taken on line III—III.

Fig. 4 is a section on line IV—IV of Fig. 1;

Fig. 5 is a view in section of a refined embodiment of my invention;

Fig. 6 is a fragmentary plan view of the cutter head taken from line VI—VI of Fig. 5.

The device as illustrated in Fig. 1 comprises a base member 2 having an angularly disposed portion 4 extending upwardly therefrom with which portion is formed a horizontal section 6. The base member 2 is formed of rigid material, such as iron, and of sufficient weight to render the entire device relatively stable against sliding or tilting when twine is pulled from the spool. Further stability is insured by securing a pair of soft rubber feet 8 to the base portion, such feet having concave lower surfaces 10 which, when the assembly rests on a flat surface such as present on a counter 94, serve to grip such surface.

Means are provided on the angularly disposed portion 4 to support a spool of twine or cord with its axis inclined to the horizontal. Such means, as here illustrated, comprises a tube 12, one end of which is provided with an annular flange 14, passed through a hole 16 in said angularly disposed portion, and rigidly secured thereto as by a collar 18 and a set-screw 20.

The external diameter of tube 12 is such as to fit fairly snugly within the cylindrical core 22 of a cord spool 24, and the length of the tube 12 is such as to engage the interior of a conical core 26 (see Fig. 2) as at 28. The external diameter of collar 18 is such as to snugly receive the larger end of core 26 therearound. In Fig. 1 a second tube 30 is provided which extends outwardly of core 22.

Either a cylindrical or a conical spool is mounted on the support as described and illlustrated and the cord is passed through the axis of the spool and through the tube or tubes as shown issuing from the bell opening 32 of tube 12.

A cutter 34, surmounted by a cord guide and safety guard 36, is secured to horizontal section 6 by suitable means such as tap screws 38. Guard 36 overlies blade 34 so as to expose merely a small margin thereof including the cutting edge 39 through a slot 40 formed in the guard. The guard also provides guiding horns 42 so that when the user draws the cord toward the blade, a substantial degree of latitude in the approach path of the cord is permitted, without, however, missing the blade.

In order that cutting of the cord may be effected at the point 44 thereof, when a pull is exerted at point 46, it is necessary that the spool portion 48 of the cord should be retarded against movement in the direction of its length. To this end I have provided drag means for restraining free movement of the cord and as here shown such means comprise a leaf spring 50 secured to inclined portion 4 as by screws 52, said spring frictionally holding the cord against the inclined base portion as shown in Fig. 4.

In use, the user of the cord draws as much thereof as needed to tie a bundle or the like, and then pulls the cord toward the knife via the guide mouth defined by horns 42 where the cord, being engaged by the blade edge, is cut thereby.

In the modifications of the invention as about to be described several unique refinements are employed, which, while possibly rendering the construction somewhat more difficult and costly, are, nevertheless, warranted when it is considered that the mechanism is one which, once purchased, should last a very long time, adapt itself to various specific needs, and offer a maximum efficiency.

In the device of Fig. 5 the spool support comprises a tube 53 threaded as at 54 at one end to receive nuts 56 for securing the same to the inclined portion 4' of the molded composition base 2' through a hole 58. The tube 53 is of a uniform external diameter and is slightly reduced as at 60 to guide a second tube 62 into telescoping relation therewith.

Means are provided to support spools having cores of various combinations of diameters at their upper and lower ends and cores of various lengths. To this end, means are provided to accommodate the lower ends of such cores, and, as here illustrated, such means comprises a conical adapter 64 having an annular foot ring 66 for seating against base portion 4' and a sleeve portion 68 fitting around tube 53. If desired, the adapter may be secured to tube 53 as by a set screw 70.

Means are also provided to snugly engage the upper ends of cores of various diameters and to prevent the cord from binding on the end of the spool. As here shown such means comprises the tube 62 which has a cylindrical portion 72 slidably received over tube 53 and belled as at 74 to guide the same onto tube 53. The tube 62 further comprises a portion forming a gradually enlarging external surface 76 which engages cores of various diameters when tube 62 is telescoped over tube 53. The tube 62 further provides a portion with an internally belled mouth 78 which insures free passage of twine without binding.

It will be clear from the foregoing that spool cores of various diameters and lengths are accommodated and held in a fixed position by supporting means as described.

In wrapping bundles as a matter of continuous production, as at the wrapping counters of department stores, laundries, and the like, the manual operations of the persons doing such operations are facilitated by any mechanical aids which permit identical movements of the hands for succeeding similar operations. Such aids have a tendency to permit subconscious control of manual movements, attended by increase in speed and efficiency.

In order to make it possible for the twine user to subconsciously control the movement of the hand in reaching for the string it is necessary that the end of the string always be found in a fixed and certain position. By fixing the position of the end of the string in a certain invariable position, the operator forms the habit of automatically reaching to the same position and grasping the string, without looking for it, or employing any other conscious effort. Not only is this desirable, but it is further desirable that the length of the end of the string which may be so grasped be sufficient to insure a firm gripping thereof. However, it is a substantial advantage to insure that the length of string which may be so grasped be no more than necessary for this purpose, for the reason that the operator works from the end of the string, the initial grasping of which avoids the necessity of subsequent search therefor, and repositioning of the string end in the hand.

Accordingly, means are provided to insure that the end of the twine shall be invariably found in one position, that the engageable length of the end of the string found in such position is such that it may be effectively gripped by the operator, and that the length of the end of the string found in such position shall be such as to insure that the operator need not search for the end of the string. As here illustrated, such means comprise means providing an issuing port O formed by an eyelet 80 secured through a perforation 82 in one end leg 84 of an M-shaped leaf spring 86, the other end leg 88 of which is provided with a hole 90 whereby said leaf spring is secured to the inclined base portion 4' by means of tube 53 and the nuts 56. The twine is threaded through eyelet 80 as shown. It is therefore evident that the leaf spring 86 and eyelet 80 fix the point at which the twine issues. Quite evidently, also, the eyelet is formed to prevent mutilation of the twine as it is drawn therefrom regardless of the direction in which the pull is exerted.

The construction is such that the point O is positioned so that the loose end 92 of the twine falls to a hanging position below the point of issue, that the space surrounding the position of said loose end is readily accessible to the hand of the operator, and that the loose end, when cut to proper length, hangs freely as shown. When hanging so that the end does not touch the counter 94, it is evident that the position of the grippable portion of the twine end is substantially invariable when the twine remains undrawn after cutting by means hereinafter described.

In order to provide for cutting the twine so that a grippable portion of the end thereof of uniform length shall be available after cutting in the fixed position indicated, means including a cutter generally of the character disclosed in Figs. 1 and 3 are provided, the cutting edge of the cutter being at such a distance from point O that after cutting a grippable length 92 remains. In the construction of this modification, however, certain inherent advantages are present not found in the first described construction.

In the use of the device as disclosed in Fig. 1 and Fig. 3, it is found that a substantial amount of effort is necessary to effect severance of the cord when pulled against the blade edge. If the cord is pulled in a direction normal to the blade edge an extraordinary pull is necessary to cut the same. It is found, however, that if the cord is pulled along the blade edge as well as against it, greater ease of cutting results. Ordinarily, however, the cord at the point 44 to be cut, approaches the edge from a direction substantially normal to the direction of the edge, that is, for example, in the direction of the arrow A, the operator's hand sweeping in the same direction. Such a motion requires an extraordinary pull against the cutting edge to effect severance. It is also found that such a pull effects a bending of the blade in a direction upwardly and normal to its plane. This is due to the fact that a component of the pull on the cord is exerted in that direction.

In order for the operator to take advantage of the ease of cutting resulting from moving the portion 44 along the edge, he must change the direction of movement of his hand so that there is a component of pull along the edge. While by doing this, a greater ease of cutting results, it is found that the cord is cut on a bias rather than on a right section. It also frequently occurs that there is an initial cutting of fibers followed by a substantial degree of unravelling and tearing apart of fibers and a final severance of the remaining uncut fibers. Reference to Figs. 1 and 3 shows that the distance from point 50 to the various points on the blade edge is variable, that to point P being the minimum. When the cord is pulled along the edge 39 the various fibers are not cut in the same right sectional plane and, if the edge happens to be dull along a portion thereof, it acts to unravel the cut fibers from those remaining uncut rather than to cut the latter fibers. Also the cord acts to bend the blade upwardly thus tending to dull its edge, or break the same.

The relatively great effort required to pull and to cut the cord with the device of Figs. 1 and 3, is objectionable for the reasons that the operator's energy is thereby expended to no useful purpose and the assembly must be made of sufficient weight to prevent loosening, tilting and sliding of the same from a desired fixed position.

In order to overcome objectionable features of the character above pointed out, means are provided to insure maximum efficiency and ease in cutting, as well as to insure a clean cut of the cord.

In order to cut all fibers of the cord at the right section, I mount the blade 34' so that its cutting edge lies in an arc, the center of curvature of which is at or in the immediate vicinity of the issue orifice O, and the radius of curvature R of which is determinative of the length of the loose end 92 of the twine after cutting. By so doing, the cut is effected in the same right section even when the cord is drawn along the cutting edge.

The blade 34' is secured to head 100, having a cylindrical arcuate surface 102, by screws 110 passing through holes or a slot in said blade. Surface 102 is such as to position the blade edge 39' in an arc having a radius of curvature R equal to the desired length of the loose end of cord 92.

In this modification a frictional drag on the cord is effected by means of a second leaf spring 112 sprung to a bias at point 114 against the saddle portion 116 of the spring 86, and between which springs the cord is threaded. Spring 112 is secured after the manner of spring 86 and is held against rotation with respect thereto by the squared tailpiece 118 thereof engaging against the spring 86.

Having described my invention, what I claim is:

1. In a twine dispenser, means for supporting spools of twine thereon, means for guiding twine to issue therefrom at a fixed point, and means providing an arcuate cutter edge centered upon said point of issue.

2. A twine dispenser for a spool of twine in which the spool is formed with a central, elongated, through passageway, a support arranged and adapted to support said spool with the passageway open at both ends for freely drawing one end of the twine through said passageway from one end thereof and out of the opposite end, a cutting blade on said support arranged and adapted for cutting twine drawn from the spool through said passageway, twine engaging means spaced from said cutting means and between the cutting blade and said opposite end of the passageway through the spool, said twine engaging means being arranged and adapted to frictionally engage opposite sides of the said one end of the twine to resist withdrawal from the spool during cutting thereof by said blade, and said support including a member arranged and adapted to support said twine engaging means in a position for suspension therefrom of that portion of the twine adapted to extend between said twine engaging means and said cutting blade with said portion free to be grasped from any side thereof by the hand of the operator.

3. A twine dispenser for a spool of twine in which the spool is formed with a central, elongated through passageway, a support for the spool including a base member adapted to rest on a substantially horizontal supporting surface provided with a spool supporting, open-ended tube adapted to fit within the central passageway of said spool, means on said support supporting said tube with a spool of twine thereon in elevated inclined position relative to said supporting surface with the lower open end of the tube opening outwardly in a generally lateral direction away from said support whereby one end of the twine from said spool may be drawn through said tube and directly out of the lower open end thereof, a cutting blade for severing a length of twine adapted to be drawn from said lower open end of the tube, twine engaging means positioned between said cutting blade and lower open end of the tube arranged and adapted to frictionally engage the twine at opposite sides thereof to prevent withdrawal of the twine from the spool during severing of the twine by the cutting blade, and means secured to said support mounting said twine engaging means in position elevated above said supporting surface and offset to one side of said support whereby the end of twine adapted to extend from the twine engaging means to said cutting blade will be freely suspended over said supporting surface for grasping at any side thereof by the hand of an operator.

4. In combination, a spool of twine formed with a central, elongated, through passageway, an open-ended tube within said passageway terminating at its opposite open ends outwardly of the opposite open ends of the passageway, a support for said tube and spool thereon, said support comprising a substantially horizontal base plate adapted to rest on a substantially horizontal supporting surface provided with an inclined extension extending outwardly and upwardly from one edge of said plate, means securing one end of said tube to said extension at a point spaced from said plate in position extending over said plate and inclined relative to horizontal whereby twine from the spool may be drawn through the tube and out of the lower end thereof from below said tube, twine engaging means carried by said extension and positioned at the side thereof opposite said tube, said twine engaging means being spaced an appreciable distance above said support and arranged and adapted to frictionally engage opposite sides of the twine drawn from the lower end of said tube against withdrawal from said spool upon severing the twine at a point beyond said twine engaging means and a cutting blade on said extension spaced above said twine engaging means arranged and adapted to sever the twine upon drawing the portion of the twine beyond said twine severing means upwardly and in engagement therewith.

HERBERT H. ROMINGER.